United States Patent Office 3,714,217
Patented Jan. 30, 1973

3,714,217
BICYCLO[n.1.0]N-ALKYL-N'-ALKOXY UREAS AS HERBICIDES
Elmar Sturm, Arlesheim, and Christian Vogel, Binningen, Switzerland, assignors to Ciba-Geigy Corporation, Ardsley, N.Y.
No Drawing. Filed Dec. 18, 1969, Ser. No. 886,356
Claims priority, application Switzerland, Dec. 23, 1968, 19,152/68
Int. Cl. C07c 119/16
U.S. Cl. 260—453 R                    2 Claims

ABSTRACT OF THE DISCLOSURE

Bicyclo[n.1.0]alkyl-ureas of the formula

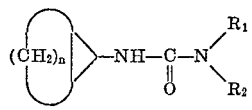

wherein $R_1$ represents hydrogen, a lower alkyl or alkoxy radical, $R_2$ represents a lower alkyl, alkenyl or alkynyl radical, and $n$ represents an interger of from 3 to 6 are disclosed as herbicidally active compounds. Herbicidal compositions and a method of controlling undesirable plant growth with the aid of such compounds are also described.

DESCRIPTION OF THE INVENTION

The present invention concerns novel bicyclo[n.1.0] alkyl-ureas, processes for the production thereof, furthermore herbicidal compositions containing these ureas as active ingredients and processes for the control of weeds and undesirable grasses using the novel active substances or agents containing them.

From the German specification open to public inspection No. 1,221,841 there are known N-bicyclo[3.3.0]- and N-bicyclo[3.2.1]octyl-N',N'-disubstituted-ureas being selective herbicides, the activity of which is unsatisfactory when used at lower concentrations.

It has now been found that novel bicyclo[n.1.0]alkyl-ureas of the Formula I:

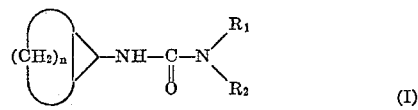

wherein $R_1$ represents hydrogen, a lower alkyl or alkoxy radical, $R_2$ represents a lower alkyl, alkenyl on alkynyl radical, and $n$ represents an interger of from 3 to 6, have a better herbicidal activity than the known compounds mentioned above.

In the general Formula I, lower alkyl radicals $R_1$ and $R_2$ are straight chain or branched radicals having 1 to 6, preferably 1 to 4 carbon atoms, e.g. methyl, ethyl, propyl, isopropyl, n-butyl, sec.butyl, tert.butyl, isobutyl. As lower alkenyl and alkynyl radicals can be mentioned, e.g. the allyl, methallyl, a propenyl radical, the propynyl or alkylpropynyl radical, allyl being preferred.

The novel bicyclo[n.1.0]alkyl-ureas of the Formula I are produced according to the present invention by reacting a bicyclo[n.1.0]alkyl isocyanate of the Formula II

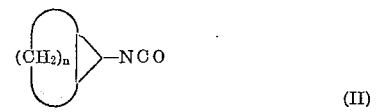

wherein $n$ corresponds to the number 3, 4, 5, or 6 with an amine of the Formula III

wherein $R_1$ and $R_2$ have the meanings given above.

The bicyclo[n.1.0]alkyl-ureas of the Formula I are also obtained by reacting a bicyclo[n.1.0]alkyl-amine of the Formula IV

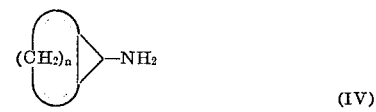

either (a) with a carbamoyl halide of the Formula V

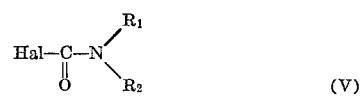

wherein Hal represents chlorine or bromine, or (b) with the components forming such a carbamoyl halide, namely phosgene and an amine of the Formula III

or (c) with a chlorocarbonic acid derivative of the Formula VI $$Cl-CO-R \qquad (VI)$$

wherein R represents chlorine or the phenoxy radical to form a carbamic acid derivative and then reacting this with an amine of Formula III, or (d) in those cases in which $R_1$ represents hydrogen, with an isocyanate of the Formula VII, $$R_2NCO \qquad (VII)$$

whereby in the Formulas II to V and VII the symbols $R_1$, $R_2$ and $n$ have the meanings given for Formula I.

It is advisable to perform the reaction (a), (b) and (c) in the presence of an acid-binding agent such as an organic base, e.g. a tertiary amine, etc., or an inorganic base, e.g. an alkali or alkaline earth metal hydroxide or oxide, or an alkali carbonate or hydrogen carbonate.

For the reaction (c), preferable chlorocarbonic acid phenyl ester is employed as carbonic acid ester and the following carbamic acid ester is obtained as intermediate product:

N-(bicyclo[n.1.0]alkyl)-O-phenyl-carbamate, and when phosgene is used:

N-(bicyclo[n.1.0]alkyl)-carbamoyl chloride.

The reactions according to the invention are usually performed in the presence of solvents or diluents which are inert to the reaction components. Suitable examples thereof are the following: aliphatic and aromatic hydrocarbons having from 5 to 8 carbon atoms and halohydrocarbons having 1 or 2 carbon atoms such as benzene, toluene, xylenes, chloroform, chlorinated ethylenes, N,N- dialkylated amides such as dialkylformamides. Ether and ether-type compounds, such as tetrahydrofurane and dioxane, high boiling ketones, such as methylethylketone and diethylketone.

The novel ureas of Formula I, in which $R_1$ represents an alkoxy radical and $R_2$ represents a lower alkyl radical can also be produced by subsequently alkylating an N-bicyclo[n.1.0]alkyl-N'-hydroxy-urea with the usual alkylating agents such as alkyl halides, dialkyl sulfates, etc. in the presence of an acid-binding agent. The N-bicyclo[n.1.0]alkyl-N'-hydroxy-ureas themselves can be obtained by reacting a bicyclo[n.1.0]alkyl isocyanate with an N-alkyl-hydroxylamine. [O. Scherer et al., Angew. Chemie 75, 851–854 (1963)].

The new bicyclo[n.1.0]alkyl-isocyanates ($n=3$, 5 or 6) serving as starting materials are obtained according to the process of Curtius, by thermally decomposing the azide of bicyclo[3.1.0]hexane-6-carboxylic acid, bicyclo[5.1.0]octane-8-carboxylic acid and of bicyclo[6.1.0]nonane-9-carboxylic acid to the corresponding isocyanates.

The azides of the above-mentioned bicycloalkane-carboxylic acids are obtained by (a) reacting the carboxylic acid chloride with an alkali azide, (b) reacting a lower alkyl ester with hydrazine and nitrous acid, or (c) reacting the free acid with chloroformic acid-lower alkyl ester and alkali metal azide in the presence of a tertiary amine [J. Weinstock, J. Org. Chem. 26, 3511 (1969)]. The reactions are preferably performed in the presence of a solvent or diluent. The azide is converted directly into the isocyanate by heating in a solvent, preferably in an aromatic hydrocarbon.

Of the bicyclo[n.1.0]alkyl amines represented by Formula IV, bicyclo[3.1.0]hexyl(6)-amine, bicyclo[5.1.0]octyl(8)-amine and bicyclo[6.1.0]nonyl(9)-amine have not previously been described. Likewise the corresponding isocyanates falling under Formula II, bicyclo[3.1.0]hexyl(6) - isocyanate, bicyclo[5.1.0]octyl(8) - isocyanate and bicyclo[6.1.0]nonyl(9)-isocyanate, are unknown.

The bicyclo[n.1.0]alkyl-amines of Formula IV used as starting material are obtained by heating the corresponding isocyanates either (a) with an alkanol or (b) with an acid. In the first case the carbamic acid ester (urethane) corresponding to the alkanol employed is obtained, which can be converted to the amine by acid or alkaline hydrolysis. For the preferred alkaline hydrolysis, inorganic bases, for example the alkali and alkaline earth metal hydroxides and carbonates are especially well suited. The acid hydrolysis is performed with halohydro-carbons, halogenated acetic acids or with mixtures of such acids. As solvents, water, alkanols having from 1 to 3 atoms and alkanol/water mixtures can be employed. In case (b), the amine salt is obtained which can be converted to the fre base by neutralization.

Furthermore the amines of Formula IV may be prepared by the acid amide-rearrangement according to Hofmann, comprising heating a corresponding bicycloalkane-carboxylic acid amide in the presence of an agent giving off bromine or chlorine and in the presence of an alkali or alkaline earth metal hydroxide or an alkali metal alkanolate. For the acid amide-rearrangement the following solvents can be employed: water, alkanols, especially lower alkanols, as well as alkanols corresponding to the optionally employed alkali metal alkanolate. When alkanols are employed, a carbamic acid ester is obtained as intermediate product which can be converted as described above into the amine.

The bicycloalkyl isocyanates of Formula II, as well as the bicycloalkyl-amines of Formula IV can exist in two isomeric forms, as exo- and as endo-isomers.

The novel ureas of Formula I possess excellent herbicidal properties. Since the herbicidal activity is inherent in the ureas obtained from both the exo- and the endo-isomeric amines and isocyanates, the expression ureas of the Formula I includes the exo-, endo- and mixtures of both isomeric bicyclo[n.1.0]alkyl-ureas. They can be employed for the control of mono- and dicotyledoneous weeds and wild grasses. In concentrations, between 0.2 and 8 kg./ha., the new ureas have a selective herbicidal effect. The action of these substances includes the types of weeds which are difficult to control as well as the deep rooted types, e.g. leguminous and umbelliferous plants. They can be applied with equal success before (preemergence) and after emergence (postemergence) of the plants. Thus field weeds, such as types of millet (Panicum sp.), types of mustard (Sinapis sp.), types of goose foot (Chenopodiaceae), field foxtail (Alopecurus sp.), types of chamomile (Matricaria sp.), can be destroyed or their growth can be hindered without damaging cultivated plants such as grains, etc.

For the preparation of herbicidal agents, the active substances are mixed with suitable carriers and/or dispersing agents. To widen the range of action, these agents can be admixed with other herbicides, for example triazines such as halogen-diamino-s-triazines, alkoxy- and alkylthio-diamino-s-triazines, triazoles, diazines such as uracils, aliphatic carboxylic acids and halogen carboxylic acids, halogenated benzoic acids and phenylacetic acids, aryloxyalkane carboxylic acids, hydrazides, amides, nitriles, esters of such carboxylic acids, carbamic acid esters and thiocarbamic acid esters, ureas, etc.

Representatives of such herbicidally active substances which can be admixed are, e.g., the following compounds:

2-chloro-4,6-bis-(ethylamino)-s-triazine,
2-chloro-4-ethylamino-6-isopropylamino-s-triazine,
2-chloro-4,6-bis-(methoxypropylamino)-s-triazine,
2-methoxy-4,6-bis-(isopropylamino)-s-triazine,
2-diethylamino-4-isopropylacetamido-6-methoxy-s-triazine,
2-isopropylamino-4-methoxypropylamino-6-methylthio-s-triazine,
2-methylthio-4,6-bis-(isopropylamino)-s-triazine,
2-methylthio-4,6-bis-(ethylamino)-s-triazine,
2-methylthio-4-ethylamino-6-isopropylamino-s-triazine,
2-methoxy-4-ethylamino-6-isopropylamino-s-triazine,
2-methoxy-4,6-bis-(ethylamino)-s-triazine,
2-chloro-4,6-bis-(isopropylamino)-s-triazine,
5-bromo-3-sec-butyl-6-methyl-uracil,
5-amino-5-chloro-1-phenyl-pyridazone-(6),
3,6-dioxo-1,2,3,6-tetrahydropyridazine,
dinitro-sec-butylphenol and salts thereof,
pentachlorophenol and salts thereof,
trichloroacetic acid and salts thereof,
2,2-dichloropropionic acid and salts thereof,
2-chloro-N,N-diallylacetic acid amide,
maleic acid hydrazide,
2,3,6-trichlorobenzoic acid and salts thereof,
2,3,5,6-tetrachlorobenzoic acid and salts thereof,
2-methoxy-3,5,6-trichlorobenzoic acid and salts thereof,
2-methoxy-3,6-dichlorobenzoic acid and salts thereof,
3-amino-2,5-dichlorobenzoic acid and salts thereof,
3-nitro-2,5-dichlorobenzoic acid and salts thereof,
2-methyl-3,6-dichlorobenzoic acid and salts thereof,
2,6-dichloro-benzonitrile,
2,6-dichloro-thiobenzamide,
2,3,6-trichlorophenylacetic acid and salts thereof,
2,4-dichlorophenoxyacetic acid and salts thereof,
2,4,5-trichlorophenoxyacetic acid, and salts and esters thereof,
(2-methyl-4-chlorophenoxy)-acetic acid, and salts and esters thereof,
2-(2,4,5-trichlorophenoxy)-propionic acid, and salts and esters thereof,
2-(2,4,5-trichlorophenoxy)-ethyl-2,2-dichloropropionate,
4-(2,4-dichlorophenoxy)butyric acid, and salts and esters thereof,
4-(2-methyl-4-chlorophenoxy)-butyric acid, and salts and esters thereof,
2,3,6-trichlorobenzyloxypropanol,
4-amino-3,5,6-trichloropicolinic acid, N'-cyclooctyl-N,N-dimethyl-urea,
3-phenyl-1,1-dimethyl-urea,
3-(4'-chlorophenyl)-1,1-dimethyl-urea,
3-(3'-trifluoromethylphenyl)-1,1-dimethyl-urea,
3-(3',4'-dichlorophenyl)-1,1-dimethyl-urea,
3-(3',4'-dichlorophenyl)-1-n-butyl-1-methyl-urea,
3-(3',4'-dichlorophenyl)-1,1,3-trimethyl-urea,
3-(3',4'-dichlorophenyl)-1,1-diethyl-urea,
3-(4'-chlorophenyl)-1-methoxy-1-methyl-urea,
3-(3',4'-dichlorophenyl)-1-methoxy-1-methyl-urea,
3-(4'-bromophenyl)-1-methoxy-1-methyl-urea,
3-(3',4'-dichlorophenyl)-3-methoxy-1,1-dimethyl-urea,
3-(4'-chlorophenoxyphenyl)-1,1-dimethyl-urea,
N,N-di-(propyl)-S-ethyl-thiocarbamate,
N,N-di-(n-propyl)-S-n-propyl-thiocarbamate,
N-ethyl-N-(n-butyl)-S-n-propyl-thiocarbamate,
N-ethyl-N-((n-butyl)-S-n-propyl-thiocarbamate,
N-phenyl-O-isopropyl-carbamate,
N-(m-chlorophenyl)-O-isopropyl-carbamate,
N-(m-chlorophenyl)-O-4-chloro-butyn-(2)-yl-carbamate,
N-(3',4'-dichlorophenyl)-O-methyl-carbamate.

The following examples illustrate the process for the production of the new compounds of Formula I. Where not stated otherwise, temperatures are expressed in degrees centigrade.

EXAMPLE 1

Dimethylamine is introduced at 0–10° into a solution of 240 g. of bicyclo[6.1.0]nonyl(9)-exo-isocyanate in 1000 ml. of anhydrous toluene until excess gas can be detected.

After 1 hour the solvent is distilled off in vacuo and the residue is recrystallised from hexane/benzene, 230 g. of colourless N-bicyclo[6.1.0]nonyl(9)-N',N'-dimethyl-urea having a melting point of 136–138° are obtained.

The bicyclo[6.1.0]nonyl(9)-exo-isocyanate used as starting material is produced as follows:

20 g. of bicyclo[6.1.0]nonane-9-carboxylic acid ethyl ester [of S. Akiyoshi and T. Matsuda, J. Amer. Chem. Soc. 77, 2476 (1955)] are added dropwise with stirring and at 100° to a mixture of 13 g. of 98% by weight hydrazine hydrate and 2 ml. of dioxane. After the addition of the ester, the mixture is refluxed for 8 hours and then cooled. 100 ml. of petroleum ether are added to the crystalline slurrey obtained and, after stiring, the solvent is removed by suction. The hydrazide is washed with ice water until it is neutral and dried in vacuo. The resultant bicyclo[6.1.0]nonane-9-carboxylic acid hydrazide, recrystallised from hexane/toluene has a melting point of 176–177°.

32 g. of bicyclo[6.1.0]nonane-9-carboxylic acid hydrazide are dissolved at −5 to +5° in a solution of 25 g. of concentrated hydrochloric acid and 350 ml. of water. This solution is added dropwise with vigorous stirring to a mixture of 28 g. of concentrated hydrochloric acid and 250 ml. of toluene. A solution of 15 g. of sodium nitrite in 50 ml. of water is simultaneously added dropwise to the mixture. The reaction mixture is then stirred for 30 minutes at 0°. The layers formed are separated and the aqueous phase is again extracted with 100 ml. of toluene. The toluene solutions are combined and washed with a solidum bicarbonate solution and then dried at 0° over sodium sulfate. The carboxylic acid azide solution is heated carefully at 70 to 80° until the strong nitrogen formation has subsided. The solution is refluxed for another 30 minutes and the toluene is removed by distillation. The residue is fractionated in vacuo. The bicyclo[6.1.0]nonyl(9)-exo-isocyanate boils at 116–120° and 13 torr.

According to the above method, on using the corresponding bicyclo[n.1.0]alkyl-carboxylic acid esters, the following isocyanates of Formula II can be obtained:

bicyclo[3.1.0]hexyl(6)-exo-isocyanate: B.P. 66–69°/19 torr
bicyclo[4.1.0]heptyl(7)-exo-isocyanate: B.P. 83–85°/14 torr
bicyclo[5.1.0]octyl(8)-exo-isocyanate: B.P. 92–95°/12 torr

EXAMPLE 2

Dimethylamine is introduced, while excluding moisture and cooling with ice, into a solution of 40 g. of bicyclo-[4.1.0]-heptyl(7)-isocyanate in 200 ml. of benzene until the solution is saturated. Stirring is continued for two hours at room temperature. The crystal slurry formed is removed by suction, washed with petroleum ether and dried, 50 g. of N-bicyclo[4.1.0]heptyl(7)-N',N'-dimethyl-urea are obtained, which recrystallized from benzene has a melting point of 131–132°.

EXAMPLE 3

40 g. of bicyclo[5.1.0]octyl (8)-exo-amine and 1 g. of triethylamine are dissolved in 500 ml. of benzene and added dropwise at 0–5° to 18.5 g. of methyl isocyanate. Then the reaction mixture is stirred for two more hours at 25°; all of the volatile components are then removed in vacuum. The residue is crystalline. The N-bicyclo[5.1.0.]octyl (8)-N'-methyl-urea, recrystallized from benzene/hexane, has a melting point of 108–110°.

The bicyclo[5.1.0]octyl(8)-exo-amine used as starting compound is prepared as follows:

17.5 g. of bicyclo[5.1.0]octyl(8)-exo-isocyanate are dissolved in 175 ml. of benzene, and 60 ml. of concentrated hydrochloric acid are added, and the mixture is refluxed for 2 hours until the generation of $CO_2$ has subsided. The benzene is removed by distillation in vacuum and the brown residue is made strongly alkaline with concentrated sodium hydroxide solution, the free amine precipitating as a brown oil.

The bicyclo[5.1.0]octyl(8)-exo-amine is distilled in vacuum and boils at 75–78°/15 mm. as a colorless oil. $n_D^{20}=1.4881$.

According to this method the following amines may be produced:

bicyclo[3.1.0]hexyl(6)-exo-amine: B.P. 56–57°/36 torr
bicyclo[6.1.0]nonyl(9)-exo-amine: B.P. 86–88°/11 torr

EXAMPLE 4

35 g. of dimethyl-carbamoyl chloride dissolved in 100 ml. of benzene are added dropwise at 5–10° to a solution of 40 g. of bicyclo[5.1.0]octyl(8)-exo-amine and 33 g. of triethylamine in 500 ml. of benzene. After stirring for 3 hours at 25°, the precipitated triethylamine hydrochloride is removed by filtration. The benzene solution is washed with water, dried and the benzene is evaporated in vacuum. The crystalline N-bicyclo - [5.1.0]octyl(8)-N',N'-dimethyl-urea obtained, recrystallized from benzene/hexane, has a melting point of 100–102°.

EXAMPLE 5

50 g. of bicyclo[4.1.0]heptyl(7) - carbamoyl chloride, which have been suspended in 500 ml. of petroleum ether, are treated with an excess of dry methylamine at 0–5°. After stirring for 2 hours at room temperature, the petroleum ether is removed and the residue is suspended in water. The N-bicyclo[4.1.0]-heptyl(7)-N'-methyl-urea is removed by suction, and dried. Recrystallized from hexane/benzene, it has a melting point of 145–146°.

The bicyclo[4.1.0]heptyl(7) - carbamoyl chloride used as starting material is produced as follows:

40 parts of bicyclo[4.1.0]heptyl(7) - amine [J. Org. Chem. 28, 3356 (1963)] are dissolved in 500 parts by volume of petroleum ether and this solution is saturated with phosgene at 0°. The N-bicyclo[4.1.0]heptyl(7)-carbamoyl chloride separates as a white precipitate and has a melting point of 41–45°. The suspension of the bicyclo [4.1.0]heptyl(7)-carbamoyl chloride in petroleum ether is used directly in the above-described reaction.

EXAMPLE 6

An aqueous solution of 2.0 g. of N-methylhydroxylamine is added dropwise while stirring and cooling to a solution of 7.0 g. bicyclo[6.1.0]nonyl(9)-isocyanate in 50 ml. of anhydrous diethyl ether. After 1 hour the organic layer is separated, the aqueous layer is extracted again with 50 ml. of diethyl ether and the diethyl ether is evaporated in vacuo. The solid crystalline residue obtained is recrystallised from hexane. N-bicyclo[6.1.0]-nonyl(9)-N'-hydroxy-N'-methyl-urea is obtained, having a melting point of 93–94°.

To a solution of 4.3 g. of N-bicyclo[6.1.0]nonyl(9)-N'-hydroxy-N'-methyl urea in 50 ml. of methanol, there is added while cooling, first a solution of 0.9 g. of sodium hydroxide in 50 ml. of methanol and then 3.4 g. of diethyl sulfate. The reaction mixture is stirred for 8 hours at room temperature (20–23°). The major part of the methanol is evaporated in vacuo and ice water is added. The separated oil is extracted with methylene chloride. The solvent is evaporated and a viscous oil is obtained, which soon crystallises. On recrystallisation from hexane, 3.2 g. of N-bicyclo[6.1.0]nonyl(9)-N'-ethoxy-N'-methyl urea, having a melting point of 67–68°, are obtained.

The following urea derivatives of the general Formula I were produced analogously to the preceding examples:

Table I

| Compounds: | Melting Point |
|---|---|
| N - bicyclo[3.1.0]hexyl(6) - N'-methyl-urea | 116–118° |
| N - bicyclo[3.1.0]hexyl(6)-N',N'-dimethyl-urea | 124–126° |
| N-bicyclo[3.1.0]hexyl(6) - N'-methyl-N'-methoxy-urea | 82–83° |
| N - bicyclo[4.1.0]heptyl(7) - N' - ethyl-urea | 41–45° |
| N - bicyclo[4.1.0]heptyl(7) - N' - iso-propyl-urea | 104–105° |
| N-bicyclo[4.1.0]heptyl(7)-N'-allyl-urea | 51–55° |
| N - bicyclo[4.1.0]heptyl(7) - N' - methoxy-N'-methyl-urea | 86–87° |
| N - bicyclo[4.1.0]heptyl(7) - N',N'-diethyl urea | 109–110° |
| N - bicyclo[4.1.0]heptyl(7) - N'-methyl-N-(1'-methyl-propynyl)-urea | 130–131° |
| N-bicyclo[5.1.0]octyl(8) - N' - methoxy-N'-methyl-urea | 90–92° |
| N-bicyclo[5.1.0]octyl(8)-N'-allyl-urea | Oil |
| N - bicyclo[5.1.0]octyl(8)-N,N' - diethyl-urea | 94–95° |
| N - bicyclo[5.1.0]octyl(8)-N'-methyl-N'-(1'-methylpropynyl)-urea | 111–113° |
| N - bicyclo[6.1.0]nonyl(9) - N'-methyl-urea | 102–104° |
| N-bicyclo[6.1.0]nonyl(9)-N'-ethyl-urea | 87–88° |
| N-bicyclo[6.1.0]nonyl(9) - N' - methoxy-N'-methyl-urea | 69–70° |
| N - bicyclo[6.1.0]nonyl(9) - N'-methyl-N'-(1'-methyl-propynyl)-urea | 98–100° |
| N-bicyclo[3.1.0]hexyl(6)-N-n-butyl-urea. | |
| N-bicyclo[4.1.0]heptyl(7)-N'-iso-butyl-urea. | |
| N-bicyclo[5.1.0]octyl(8)-N'-n-pentyl-urea. | |
| N-bicyclo[5.1.0]octyl(8)-N'-n-hexyl-urea. | |
| N-bicyclo[6.1.0]nonyl(9)-N'-methallyl-urea. | |
| N-bicyclo[3.1.0]hexyl(6)-N'-propynyl-urea. | |

The herbicidal activity of the new compounds of the Formula I is shown by the following tests:

(1) Preemergence test

The active substance was mixed in the form of a 10% by weight powder concentrate to garden soil to obtain a concentration of 100 mg. (milligram) per 1000 ml. of soil. The following test plants were sown in seed dishes containing the prepared soil: oats, mustard, ray grass, barley, tomatoes and vetch.

The dishes were then kept in a greenhouse ta 20–24° C. and at 70% relative humidity and continuously illuminated. The tests were evaluated after 20 days according to the following scale:

10 = no damage (= control plant)
9–1 = increasing degrees of damage
0 = plants destroyed The following compounds have been tested:

Table II

| Nr. | Compound |
|---|---|
| 1 | N-bicyclo[3.1.0]hexyl(6)-N'-methyl-urea. |
| 2 | N-bicyclo[3.1.0]hexyl(6)-N',N'-dimethyl-urea. |
| 3 | N-bicyclo[3.1.0]hexyl(6)-N'-methyl-N'-methoxy-urea. |
| 4 | N-bicyclo[4.1.0]heptyl(7)-N'-methyl-urea. |
| 5 | N-bicyclo[4.1.0]heptyl(7)-N'-ethyl-urea. |
| 6 | N-bicyclo[4.1.0]heptyl(7)-N'-isopropyl-urea. |
| 7 | N-bicyclo[4.1.0]heptyl(7)-N',N'-dimethyl-urea. |
| 8 | N-bicyclo[4.1.0]heptyl(7)-N',N'-diethyl-urea. |
| 9 | N-bicyclo[4.1.0]heptyl(7)-N'-methyl-N'-methoxy-urea. |
| 10 | N-bicyclo[4.1.0]heptyl(7)-N'-alkyl-urea. |
| 11 | N-bicyclo[4.1.0]heptyl(7)-N'-methyl-N'-(1'-methyl-propynyl)-urea. |
| 12 | N-bicyclo[5.1.0]octyl(8)-N'-methyl-urea. |
| 13 | N-bicyclo[5.1.0]octyl(8)-N',N'-dimethyl-urea. |
| 14 | N-bicyclo[5.1.0]octyl(8)-N',N'-diethyl-urea. |
| 15 | N-bicyclo[5.1.0]octyl(8)-N'-methyl-N'-methoxy urea. |
| 16 | N-bicyclo[5.1.0]octyl(8)-N'-alkyl-urea. |
| 17 | N-bicyclo[5.1.0]octyl(8)-N'-methyl-N'-1'-methyl-propynyl)-urea. |
| 18 | N-bicyclo[6.1.0]nonyl(9)-N'-methyl-urea. |
| 19 | N-bicyclo[6.1.0]nonyl(9)-N',N'-dimethyl-urea. |
| 20 | N-bicyclo[6.1.0]nonyl(9)-N'-methyl-N'-methoxy-urea. |
| 21 | N-bicyclo[6.1.0]nonyl(9)-N'-methyl-N'-(1'-methyl-propynyl)-urea. |

The 10% by weight powder concentrate used had the following composition:

10 parts of active substance, 0.6 part of dibutylnaphthalene sodiumsulfonate, 1 part of naphthalene sulfonic acids/phenol sulfonic acids/formaldehyde condensate (ratio 3:2:1), 10 parts of sodium-aluminium-silicate and 78.4 parts of kaolin.

(2) Postemergence test (A)

Oats and mustard plants in the 4- to 6-leaf stage were sprayed with an aqueous emulsion of the active substance in a concentration of 0.5 g. of active substance per square meter of soil. The emulsion was obtained from a 25% by weight emulsifiable concentrate. The plants were then kept at 25–28° C. and 40 to 50% relative humidity. The tests were evaluated 14 days after treatment according to the following scale:

10 = no damage (= control plant)
9–1 = increasing degrees of damage
0 = plants destroyed The emulsifiable concentrate used was prepared by mixing 25 parts of active substance, 32.5 parts of isophorone, 32.5 parts of methylethyl ketone and 10 parts of an emulsifier consisting of nonylphenol-polyoxyethylene and dodecylbenzene-calcium sulfonate.

TABLE III

| Compound number (Table II) | Preemergence | | | | | Postemergence | | |
|---|---|---|---|---|---|---|---|---|
| | Oats | Rye grass | Mustard | Tomatoes | Vetch | Barley | Oats | Mustard |
| 1 | 0 | 0 | 0 | (¹) | 2 | | | |
| 2 | 0 | 0 | 0 | | 4 | | 4 | 0 |
| 3 | 0 | 0 | 0 | | 2 | | | |
| 4 | 0 | 0 | 0 | | 1 | | 5 | 1 |
| 5 | 4 | 2 | 0 | | 3 | | 1 | 0 |
| 6 | 5 | 6 | 0 | | | | | |
| 7 | 0 | 0 | 0 | | 2 | | | |
| 8 | 3 | 0 | 0 | | 0 | | | |
| 9 | 0 | 0 | 0 | | 0 | | 5 | 0 |
| 10 | | | 5 | 1 | | | | |
| 11 | 1 | 0 | 0 | | 2 | | | |
| 12 | 1 | 0 | 0 | | 0 | | | 0 |
| 13 | 1 | 0 | 0 | | 2 | | 0 | 0 |
| 14 | 3 | 2 | 0 | 0 | 1 | 0 | 2 | 0 |
| 15 | 0 | 0 | 0 | 0 | 2 | 1 | 2 | 0 |
| 16 | 4 | 3 | 0 | 2 | | 2 | | |
| 17 | 1 | 1 | 0 | 0 | 2 | 0 | 2 | 1 |
| 18 | 0 | 0 | 0 | 0 | 0 | 6 | | |
| 19 | 0 | 0 | 0 | 0 | 3 | 0 | 0 | 0 |
| 20 | 0 | 0 | 0 | 0 | 1 | 0 | | |
| 21 | 3 | 1 | 0 | 0 | 4 | 0 | 3 | 0 |

¹ Not tested.

(3) Postemergence test (B)

The following were sown in seed trays as test plants:

Rye grass _____ (*Lolium multiflorum*).
Chamomile _____ (*Matricaria chamomilla*).
Barley _____ (*Panicum italicum*).
Dandelion _____ (*Taraxacum officinalis*).
Vetch _____ (*Vicia saliva*).
and
Foxtail _____ (*Setaria glaucum*).

In the 4-leaf stage, the plants are treated with a 2% aqueous emulsion of the active substance [obtained from a 25% emulsifiable concentrate of the composition given under 2] and then kept under continuous illumination at 25–28° and 40–50% relative humidity. The test is evaluated after 18 days using the following scale.

9 = plants undamaged (= control)
1 = plants dead
8–2 = intermediate degrees of damage The amounts of test substance used are given in Table IV.

active substances are applied to the surface of the soil as an aqueous suspension obtained from a 25% wettable powder. The seed trays are then kept under continuous illumination at 22–23° and 50–70% relative humidity.

The following test plants were sown:

Italian rye grass ___ (*Lolium multiflorum*).
Barley _____ (*Setaria italica, Panicum italicum*).
Mustard _____ (*Sinapis alba*).
Wheat _____ (*Triticum vulgare*).
Cotton _____ (*Gossypium herbaccara*).

The test plants were evaluated after 28 days according to the following scale.

9 = plants undamaged (= control)
1 = plants dead
8–2 = intermediate degrees of damage The amounts of test substance used are given in Table V.

Composition of the 25% wettable powder: 25 parts of active substance, 10 parts of sodium-aluminium silicate, 0.6 part of sodium dibutylnaphthyl sulfonate, 1.0 part of

TABLE IV

| Compound number (Table II): | Concentration, kg./ha. | Weeds | | | | | |
|---|---|---|---|---|---|---|---|
| | | Rye grass | Chamomile | Barley | Dandelion | Vetch | Foxtail |
| 13 | 1.2 | 3 | 1 | 2 | 1 | 1 | 1 |
| | 0.5 | 7 | 3 | 4 | 1 | 3 | 1 |
| Comparison ¹ | 1.2 | 6 | 8 | 5 | 3 | 4 | 7 |
| | 0.5 | 7 | 7 | 8 | 7 | 6 | 3 |

¹ N-bicyclo[3.3.0]octyl-N′,N′-dimethyl-urea known from the German patent application open for public inspection No. 1,221,841.

(4) Preemergence test with sown test plants

Immediately after the test plants have been sown, the naphthalene-sulfonic acid/phenol-sulfonic acid/formaldehyde condensation product (3:2:1), 63.4 parts of kaolin.

These wettable powders are suspended in appropriate amounts of water to make up 1000 liters per hectare.

TABLE V

| Compound number (Table II): | Concentration, kg./ha. | Weeds | | | Cultivated plants | |
|---|---|---|---|---|---|---|
| | | Rye grass | Barley | Mustard | Wheat | Cotton |
| 9 | 2 | 4 | 2 | 1 | 9 | |
| | 1 | | 3 | 2 | 9 | |
| | 0.5 | | 3 | 4 | 9 | |
| 19 | 2 | 2 | 1 | 2 | 8 | 9 |
| Comparison[1] | 2 | 4 | 3 | 3 | 8 | 9 |
| | 1 | 9 | 8 | 6 | 9 | 9 |
| | 0.5 | 9 | 9 | 9 | 9 | 9 |

[1] N-bicyclo[3.3.0]octyl-N,N'-dimethyl-urea known from the German patent application open for public inspection No. 1,221,841.

The production of herbicidal compositions according to the invention is performed in known manner by intimate mixing and grinding of active substances of the general Formula I together with suitable carriers, optionally with the addition of dispersing agents or solvents, which are inert towards the active substances. The active substances can be used and applied, e.g. as:

Dusts, scattering agents, granulates, coated granulates, impregnated granulates, homogeneous granulates, wettable powders, pastes, emulsions or solutions.

For the production of solid preparations (dusts, scattering agents, granulates) the active ingredients are mixed with solid carriers. Examples of suitable carriers are kaolin, talcum, bole, loess, chalk, limestone, ground limestone, attaclay, dolomite, diatomaceous earth, precipitated silicic acid, alkaline earth silicates, sodium and potassium aluminium silicates (feldspar and mica), calcium and magnesium sulfates, magnesium oxide, ground synthetic plastics, fertilizers such as ammonium sulfate, ammonium phosphates, ammonium nitrate, urea, ground vegetable products such as bran, bark dust, sawdust, ground nutshells, cellulose powder, residue of plant extractions, active charcoal, etc. These carriers can be used alone or admixed with each other.

The particle size of the carriers is, for dusts advantageously up to about 0.1 mm., for scattering agents from about 0.075 to 0.2 mm. and for granulates 0.2 mm. or coarser.

The concentrations of active substance in the solid preparations are from 0.5 to 80%.

To these mixtures can also be added additives which stabilize the active substance and/or non-ionic, anionic and cationic surface active substances, which for example, improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5-15 ethylene oxide radicals per molecule and 8-9 carbon atoms in the alkyl radical, lignin sulfonic acids, their alkali metal and alkaline earth metal salts, polyethylene glycol ethers (carbowaxes), fatty alcohol polyethylene glycol ethers having 5 to 20 ethylene oxide radicals per molecule and 8-18 carbon atoms in the fatty alcohol moiety, condensation products of ethylene oxide, propylene oxide, polyvinyl pyrrolidones, polyvinyl alcohols, condensation products of urea and formaldehyde, and also latex products.

The water-dispersible concentrates of the active substance, i.e. wettable powders, pastes and emulsion concentrates, are compositions which can be diluted with water to any concentration desired. They consist of active substance, carrier, optionally additives which stabilize the active substance, surface-active substances and anti-foam agents and, optionally, solvents. The concentration of active substance in these agents is 5-80%.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and formaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl diluaryl ammonium chloride and fatty acid alkali and alkailne earth metal salts.

Suitable anti-foam agents are, for example, silicones.

The active substances are so mixed, ground, sieved and strained with the additives mentioned above that, in wettable powders, the solid particle size from 0.02 to 0.04 and in pastes, of 0.03 is not exceeded. To produce emulsion concentrates and pastes, dispersing agents such as those given in the previous paragraphs, organic solvents and water are used. Examples of suitable solvents are the following: alcohols, bnzene, xylenes, toluene, dimethyl sulfoxide, and mineral oil fractions boiling betwen 120 and 350°. The solvents must be practically odorless, not phytotoxic, inert to the active substances and not readily inflammable.

Furthermore, the compositions according to the invention can be applied in the form of solutions. For this purpose the active substance or several active substances of general Formula I are dissolved in suitable organic solvents, mixtures of solvents or in water. Aliphatic and aromatic hydrocarbons, chlorinated derivatives thereof, alkyl naphthalenes and mineral oils alone or mixed with each other can be used as organic solvents. The solution should contain the active substances in a concentration of from 1 to 20%.

The compositions described according to the invention can be mixed with other biocidally active compounds or agents. Thus to broaden the range of action, the new compositions can contain, e.g. insecticides, fungicides, bactericides, fungistatics, bacteriostatics or nematocides in addition to the compounds mentioned of the general Formula I. The compositions according to the invention can also contain fertilizers, trace elements, etc.

In the following, application forms of the new ureas are described. "Parts" mean parts by weight.

EXAMPLE 7

The following ingredients are used to produce a 5% granulate:

| | Parts |
|---|---|
| N-bicyclo[5.1.0]octyl(8)-N'-methyl-urea | 5 |
| Epichlorohydrin | 0.25 |
| Cetyl polyglycol ether with 8 mol ethyleneoxide | 0.25 |
| Polyglycol ("carbowax") | 3.50 |
| Kaolin (particle size 0.3-0.8 mm.) | 91 |

The active ingredient is mixed with epichlorohydrin and dissolved in 6 parts of acetone, then the polyglycol and cetyl polyglycol ether are added. The resulting solution is sprayed onto kaolin and then evaporated in vacuum.

EXAMPLE 8

The following componens are used for the preparation of (a) 50%, (b) 25% and (c) 10% wettable powders:

(a)

| | Parts |
|---|---|
| N-bicyclo[5.1.0]octyl(8)-N',N'-dimethylurea | 50 |
| Sodium dibutylnaphthyl sulfonate | 5 |
| Naphthalene sulfonic acid/phenol sulfonic acid/ | |

| | Parts |
|---|---|
| formaldehyde condensation product 3:2:1 | 3 |
| Kaolin | 20 |
| Champagne chalk | 22 |

(b)

| | Parts |
|---|---|
| N-bicyclo[4.1.0]heptyl(7)-N',N'-dimethylurea | 25 |
| Sodium salt of oleylmethyl tauride | 5 |
| Naphthalene sulfonic acid/formaldehyde condensation product | 2.5 |
| Carboxymethyl cellulose | 0.5 |
| Neutral potassium aluminium silicate | 5 |
| Kaolin | 62 |

(c)

| | Parts |
|---|---|
| N - bicyclo[4.1.0]heptyl(7) - N'-methyl-N'-methoxyurea | 10 |
| Mixture of sodium salts of saturated fatty alcohol sulfates | 3 |
| Naphthalene sulfonic acid/formaldehyde condensation product | 5 |
| Kaolin | 82 |

The given active ingredient is absorbed onto the corresponding carriers (kaolin and chalk) and then mixed and ground. Wettable powders having excellent wettability and suspensibility are obtained. By dilution with water, suspensions of any desired concentration of the active ingredients can be obtained from such wettable powders. Such suspensions are suitable for the control of weeds and wild grasses in cultivated plantations.

EXAMPLE 9

The following ingredients are used for the preparation of a 45% paste:

| | Parts |
|---|---|
| N-bicyclo[3.1.0]hexyl(6)-N'-methyl-urea | 45 |
| Sodium aluminium silicate | 5 |
| Cetyl polyglycol ether with 8 mol ethylene-oxide | 14 |
| Oleyl polyglycol ether with 5 mol ethylene-oxide | 1 |
| Spindle oil | 2 |
| Polyglycol ("carbowax") | 10 |
| Water | 23 |

The active ingredient is intimately mixed and ground with the additives in suitable apparatus. A paste is obtained which can be diluted with water to prepare suspensions of any desired concentration. These suspensions are suitable for the treatment of vegetable plantations.

EXAMPLE 10

To prepare a 10% emulsion concentrate

| | Parts |
|---|---|
| N - bicyclo[3.1.0]hexyl(6) - N'-methyl-N'-methoxyurea | 10 |
| Oleyl polyglycol ether having 5 mol of ethylene oxide | 15 |
| and, | |
| Isphorone | 75 | are mixed together. This concentrate can be diluted with water to emulsions of suitable concentrations. Such emulsions are suitable for the control of weeds in cultivated plantations such as cotton, maize, etc.

We claim:
1. Bicyclo[n.1.0]alkyl-ureas of the Formula I:

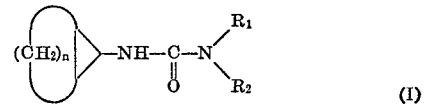

wherein
$R_1$ represents lower alkoxy,
$R_2$ represents lower alkyl, and
$n$ represents an integer of from 3 to 6.

2. N-bicyclo[4.1.0]heptyl(7) - N'-methyl-N'-methoxyurea.

References Cited

UNITED STATES PATENTS

| 3,304,167 | 2/1967 | Buntin et al. | 260—563 P |
| 3,454,393 | 7/1969 | Müller et al. | 71—119 |
| 3,520,925 | 7/1970 | Koenig et al. | 71—119 |
| 3,555,086 | 1/1971 | Weis et al. | 260—453 R |
| 3,347,658 | 10/1967 | Luckenbaugh | 71—119 |
| 3,504,030 | 3/1970 | Vogt | 260—563 P |
| 3,527,756 | 9/1970 | Szmuszkovicz | 260—563 P |

OTHER REFERENCES

Kirmse et al. "Reaktionen des bicyclo[3.1.0]hexyl-3-carbens," Chem. Ber. 100, pp. 3564–77 (1967).

Farbenfabriken Bayer, "Prep. of Insecticides and Miticides" (1967), CA 67, No. 82282p (1967).

LEWIS GOTTS, Primary Examiner

G. HOLLRAH, Assistant Examiner

U.S. Cl. X.R.

71—119; 260—453 A, 468 B, 500.5 H, 514 B, 544 C, 553 R, 554, 563 R